Patented Dec. 29, 1931

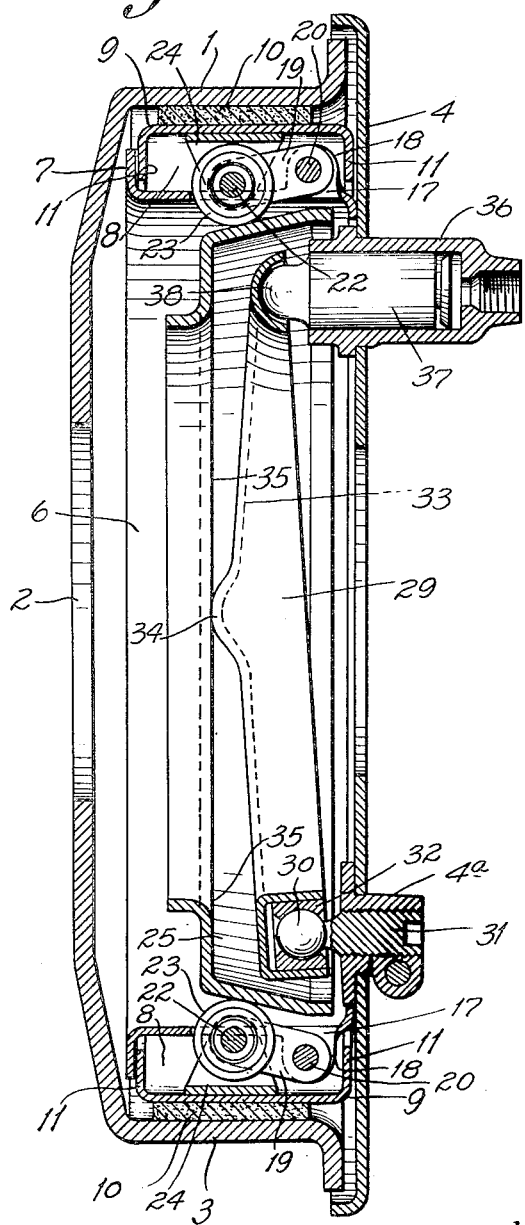
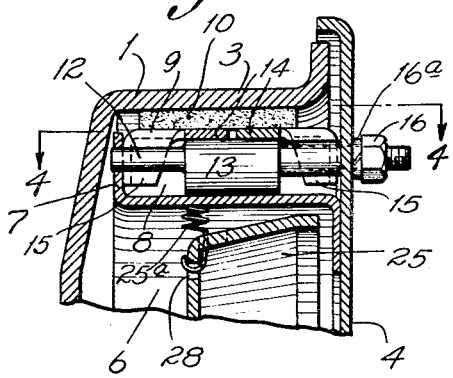

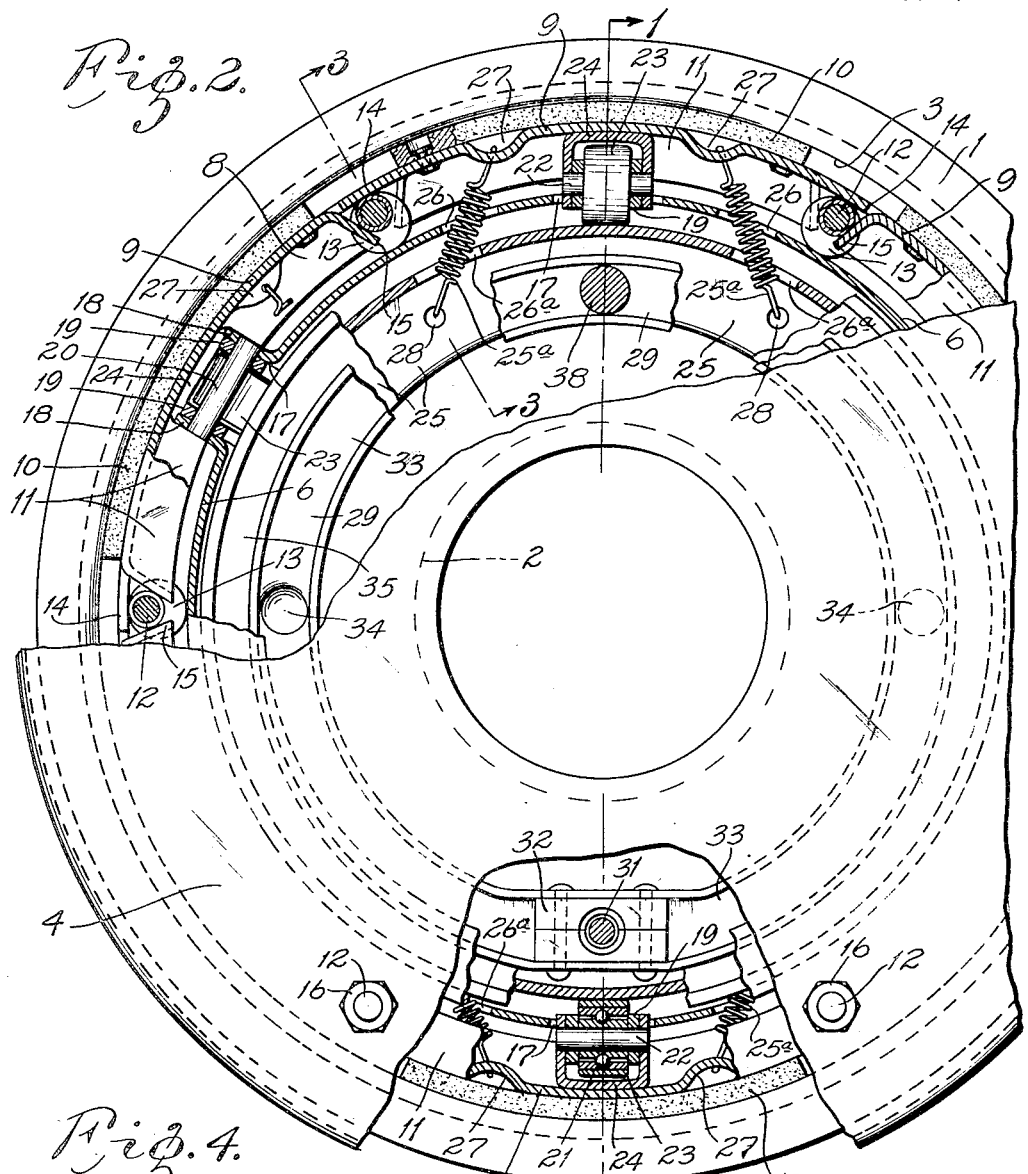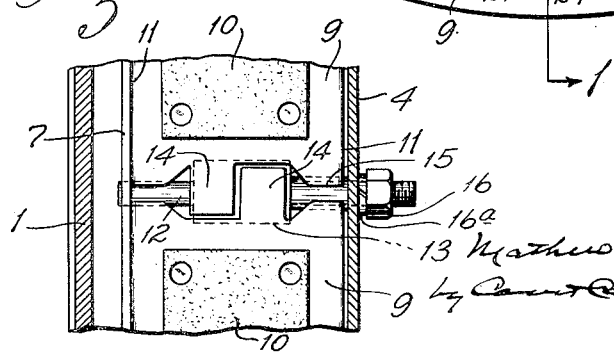

1,838,188

UNITED STATES PATENT OFFICE

MATHEW B. MORGAN, OF DETROIT, MICHIGAN, ASSIGNOR TO THE TIMKEN-DETROIT AXLE COMPANY, OF DETROIT, MICHIGAN, A CORPORATION OF OHIO

BRAKE

Application filed November 30, 1928. Serial No. 322,598.

This invention relates to brakes, particularly to automobile brakes of the kind wherein a circular series of radially movable arcuate brake shoes are moved radially outward into engagement with the interior surface of a brake drum to arrest or retard the rotary movement thereof. The invention has for its principal objects to produce a brake of the above type that is simple, compact and easily operated and is not likely to get out of repair; to provide means for automatically taking up undesirable play of the parts of the brake; to provide means for adjusting the shoes towards and away from the brake drum; and to obtain other advantages hereinafter appearing. The invention consists in the brake and in the parts and combinations and arrangement of parts hereinafter described and claimed.

In the accompanying drawings, which form part of this specification and wherein like symbols refer to like parts wherever they occur;

Fig. 1 is an axial section through a brake embodying my invention, the section being taken on the line 1—1 in Fig. 2;

Fig. 2 is an inside face view of the brake, parts being shown broken away to more clearly illustrate the invention;

Fig. 3 is a fragmentary cross-section on the line 3—3 in Fig. 2; and

Fig. 4 is a fragmentary cross-section on the line 4—4 in Fig. 3.

For purpose of illustration, my invention is shown in connection with a brake drum 1 adapted to be fixed to and rotated with the wheel (not shown) of an automobile. The brake drum 1 is provided with a central circular axle receiving opening 2 and a circular brake flange 3. The open end of the brake drum 1 is closed by means of a stationary brake disk or backing plate 4 adapted to be rigidly secured to the stationary axle housing (not shown). The construction thus far described is well known and is considered unnecessary to illustrate it in detail.

Projecting into the brake drum 1 from the inside face of the stationary brake disk 4 is a cylindrical tube portion 6 which is concentric with said disk and terminates at its outer end in an outstanding flange 7 located adjacent to the inner wall of said drum. As shown in the drawings, the laterally projecting tube portion 6 of the brake disk cooperates with the inner face of said disk to form an outwardly opening annular channel 8, within which is arranged a circular series of radially movable arcuate brake shoes 9 that are provided on their outer faces with a suitable brake lining material 10 adapted to frictionally engage the inner face of said brake flange 3 of the brake drum 1. As shown in the drawings, each of said brake shoes 9 is of substantially channel-shaped cross-section; that is it comprises an outer web portion, to which the brake lining material 10 is secured, and side marginal flanges 11 extending into the annular channel 8.

The brake shoes 9 are adjusted towards and away from the brake flange 6 of the drum to obtain the desired clearance by means of studs 12 extending between the ends of adjacent shoes with their ends journaled in alined openings provided therefor in the stationary brake disk 4 and in the outstanding flange 7 at the end of the tubular projection 6 on the inner face of said brake disk. The studs are provided intermediate their ends with eccentric portions 13 adapted to bear against the inner faces of the tabs or extensions 14 at the ends of the web portions of adjacent shoes, whereby rotation of said studs causes the eccentric portions 13 thereof to engage said extensions and thus force the shoes radially outward towards the brake flange of the brake drum. Said studs also serve as stops for holding the shoes clear of the bottom of the annular channel 8. The web portions of the shoes are also provided beyond the ends of the eccentric portions 13 of the studs 12 with inwardly bent end flanges 15 adapted to abut against the sides of the studs and thus prevent rotation of the shoes with the drum. The studs are provided at their outer ends with nuts 16 and lock washers 16a for clamping the studs to the stationary brake disk in the desired position of adjustment.

The tubular projection of the stationary brake disk is provided midway of the ends of each brake shoe with a longitudinally extending slot 17 provided at its opposite side margins with oppositely disposed outstanding ears or lugs 18. A pair of parallel lever arms 19 extend longitudinally of said slot with one end pivotally supported between the outstanding lugs 18 thereof by means of a pivot pin 20 which extends through alined openings provided therefor in said arms and said lugs. Supported on a suitable antifriction bearing 21 on a cross-pin 22 which connects the free outer ends of the spaced parallel lever arms 19 is a roller 23; and straddling said arms and the roller carried thereby is a channel-shaped saddle member 24, whose side flanges extend inwardly and are pivotally supported on the ends of the cross-pin and whose web is disposed beyond the roller in position to bear against the inner face of the web of the adjacent brake shoe.

Located between and supported by the circular series of radially movable rollers 23 carried by the tubular extension 6 of the stationary brake disk 3 is a wedge member 25 adapted to be shifted lengthwise of the axis of the brake drum to spread apart said rollers and thus force the brake shoes outwardly against the brake flange of the brake drum. As shown in the drawings, the wedge member is preferably in the form of a hollow cone which is located between the rollers with the small end of its cone surface disposed nearest the inner wall of the drum, whereby said cone, when moved inwardly, engages the rollers and thus causes them to swing outwardly on their supporting arms and force the brake shoes into engagement with the brake flange. Each brake shoe is connected to the cone by means of coil springs 25a located adjacent to the end of the shoe. Said springs extend through openings 26 and 26a provided therefor in the brake disk tube and the cone, respectively, and have their outer ends hooked over depressed portions 27 in the webs of said shoes and their inner ends hooked into holes 28 in the inner wall of the cone.

The cone 24 is forced inwardly between the radially movable rollers 23 by means of an annular pressure member or ring 29, which has a swivel fastening or connection at its lower end with the stationary brake disk. As shown in the drawings, said swivel connection is in the form of a ball-and-socket joint formed by a ball 30 which projects from the inside face of the brake disk and works on a socket provided therefor in the outside face of the pressure ring. The ball 30 is formed on the end of a stud 31, which is threaded into a bracket 4a rigidly secured to the stationary brake disk, and the socket is formed by the split socket plate 32 riveted or otherwise rigidly secured within a circular channel 33 formed in the outside face of the pressure ring. The inside face of the swiveled pressure ring is provided at diametrically opposite points located one on each side of its swivel with outstanding bosses or corrugations 34, which are adapted to press against the opposing face of an inwardly projecting flange 35 at the small end of the hollow spreader cone 25.

The pressure ring is swung inwardly into engagement with the spreader cone, to swing the rollers outwardly on their supporting arms and thus force the brake shoes into engagement with the brake flange of the brake drum, by a fluid operated cylinder 36 mounted on the stationary brake disk. The cylinder 36 is located opposite the free upper end of the pressure ring at a point diametrically opposite its swivel, with the piston 37 of said cylinder movable longitudinally of the axis of the brake drum towards and away from the outer face of said pressure ring. The end of the piston which cooperates with the pressure ring is provided with a hemispherical end portion 38 adapted to seat within the circular groove or channel in the outer face of the ring. By this arrangement, when pressure is applied to the cylinder, the piston engages the free upper end of the pressure ring and swings the same inwardly against the spreader cone. It is noted that the ball-and-socket support for the lower end of the pressure ring permits said ring to swivel freely and thus secure contact between the diametrically opposed bosses 34 of said ring and the spreader cone in any position that the latter may assume.

The hereinbefore described brake has numerous advantages. It is simple and easy to operate and there are few parts to get out of repair. The pressure ring, the cone member and the brake shoes are mounted so as to float within the brake drum and are thus adapted to automatically take up any wear of the parts or inaccuracies in manufacture. The parts are made of light weight stampings which can be economically produced; and the use of the rollers operates to reduce friction and thus make the brake easy to operate. Obviously, numerous changes may be made without departing from the invention; therefore, I do not wish to be limited to the precise arrangement shown and described.

What I claim is:

1. A brake construction comprising circularly arranged radially movable brake shoes, a wedge member cooperating with said shoes for spreading them apart, means for yieldably connecting said wedge member and said shoes, and means for actuating said wedge member.

2. A brake construction comprising a stationary tubular support, brake shoes arranged around said support for movement towards and away therefrom, a wedge member movable longitudinally of said tubular supporting member and adapted to cooperate with said shoes to move the same to braking position, and a series of coil springs connecting said wedge member and said shoes.

3. A brake construction comprising a stationary tubular support, brake shoes arranged around said support for movement towards and away therefrom, a wedge member movable longitudinally of said tubular support and adapted to cooperate with said shoes to move the same to braking position, means yieldably connecting said shoes and said wedge member, and means for actuating said wedge member.

4. A brake comprising a stationary brake disk provided with a tubular extension, a circular series of radially movable brake shoes supported on said tubular extension, a wedge member movable longitudinally of said tubular extension and adapted to cooperate with said shoes to move the same into braking position, and means pivotally supported on the brake disk and adapted to be swung into engagement with said wedge member to move the same to operative position.

5. A brake comprising a stationary brake disk provided with a laterally extending cylindrical tube portion, a circular series of radially movable brake shoes surrounding said tube portion, a cone mounted in said tubular extension for movement longitudinally thereof, radially movable shoe actuating means located between said shoes and the conical surface of said cone and adapted to be moved outward when engaged by the latter, and a member pivotally supported on said stationary brake disk and adapted to be swung into engagement with said cone to move the latter to operative position.

6. A brake comprising a stationary support, brake members, and studs journaled on said support at the ends of adjacent brake members for limiting endwise movement thereof, said studs being provided intermediate their ends with eccentric portions adapted to engage the inner faces of adjacent shoes, and the end portions of adjacent shoes being provided with portions that bear against said studs on opposite sides of the eccentric portions thereof.

7. A brake comprising a stationary support provided with an outwardly opening annular channel, a circular series of radially movable brake members mounted in said channel, stops rotatably mounted in said channel and extending between the ends of adjacent brake members, and the adjacent ends of said brake members being provided with extensions that overlap said stops and said stops being provided with eccentric portions that engage said extensions.

8. A brake comprising a stationary member provided with a laterally projecting tubular portion, a series of brake shoes surrounding said tubular portion and movable transversely thereof, said tubular portion being provided adjacent to the inner face of each brake shoe with a longitudinal slot, a shoe actuating member mounted in said slot for movement transversely of said tubular portion, a conical member movable longitudinally of said tubular portion and adapted to cooperate with the inner face of said shoe actuating member to move the same outwardly, and a member pivotally supported on said stationary member and adapted to be swung into engagement with said conical member to move the latter to operative position.

9. A brake comprising a stationary member provided with a laterally projecting tubular portion, a series of brake shoes surrounding said tubular portion and movable transversely thereof, said tubular portion being provided adjacent to the inner face of each brake shoe with a longitudinal slot, a shoe actuating member mounted in said slot for movement transversely of said tubular portion, a conical member movable longitudinally of said tubular portion and adapted to cooperate with the inner face of said shoe actuating member to move the same outwardly, means for yieldably holding said conical member in engagement with said shoe actuating member, and a member supported on said stationary member and adapted to cooperate with said conical member to move the same to operative position.

10. A brake comprising a stationary member provided with a laterally projecting tubular portion, a series of brake shoes surrounding said tubular portion and movable transversely thereof, said tubular portion being provided adjacent to the inner face of each brake shoe with a longitudinal slot, a shoe actuating member mounted in said slot for movement transversely of said tubular portion, a conical member movable longitudinally of said tubular portion and adapted to cooperate with the inner face of said shoe actuating member to move the same outwardly, and a member supported on said stationary member and adapted to cooperate with said conical member to move the same to operative position, said last mentioned member having a swivel connection with said stationary member.

11. A brake comprising a stationary brake disk having a cylindrical tube portion projecting therefrom, a circular series of radially movable brake shoes surrounding said tube portion, said tube portion being provided opposite each shoe with a longitudinal slot, an arm pivotally supported in said slot for swinging movement radially of said tube, a roller rotatably supported on the free end of said arm, a member mounted on said arm and adapted to engage the inner face of the adjacent brake shoe, and a cone mounted in said tube and adapted to be shifted longitudinally thereof to move the rollers and the parts cooperating therewith outwardly.

12. A brake comprising a stationary brake disk having a cylindrical tube portion projecting therefrom, a circular series of radially movable brake shoes surrounding said tube portion, said tube portion being provided opposite each shoe with a longitudinal slot, an arm pivotally supported in said slot for swinging movement radially of said tube, a roller rotatably supported on the free end of said arm, a member mounted on said arm and adapted to engage the inner face of the adjacent brake shoe, a cone mounted in said tube and adapted to be shifted longitudinally thereof to move the rollers and the parts cooperating therewith outwardly, and a pressure ring for moving said cone to operative position, said pressure ring being provided with diametrically opposed portions adapted to bear against the cone and having a swivel connection with said stationary brake disk on a line substantially midway of said diametrically opposed cone engaging portions.

13. A brake comprising a stationary brake disk having a cylindrical tube portion projecting therefrom, a circular series of radially movable brake shoes surrounding said tube portion, said tube portion being provided opposite each shoe with a longitudinal slot, an arm pivotally supported in said slot for swinging movement radially of said tube, a roller rotatably supported on the free end of said arm, a member mounted on said arm and adapted to engage the inner face of the adjacent brake shoe, a hollow cone supported in said tube between the rollers adapted to be shifted longitudinally thereof to move said rollers and the shoes cooperating therewith outwardly, means for yieldably holding said cone in position between said rollers, and a pressure ring located within said hollow cone and adapted to exert an endwise pressure in a direction that will move said cone to operative position.

14. A brake comprising a stationary brake disk having a cylindrical tube portion projecting therefrom, a circular series of radially movable brake shoes surrounding said tube portion, said tube portion being provided opposite each shoe with a longitudinal slot, an arm pivotally supported in said slot for swinging movement radially of said tube, a roller rotatably supported on the free end of said arm, a member mounted on said arm and adapted to engage the inner face of the adjacent brake shoe, a hollow cone supported in said tube between the rollers adapted to be shifted longitudinally thereof to move said rollers and the shoes cooperating therewith outwardly, means for yieldably holding said cone in position between said rollers, and a pressure ring located within said hollow cone and adapted to exert an endwise pressure in a direction that will move said cone to operative position, said pressure ring being provided with diametrically opposed portions adapted to bear against said cone and having a swivel connection with said stationary brake disk on a line substantially midway of said diametrically opposed cone engaging portions.

15. A brake comprising a stationary brake disk having a cylindrical tube portion projecting therefrom, a circular series of radially movable brake shoes surrounding said tube portion, said tube portion being provided opposite each shoe with a longitudinal slot, an arm pivotally supported in each slot for swinging movement radially of said tube, a roller rotatably supported on the free end of each arm, a member mounted on each arm and adapted to engage the inner face of the adjacent brake shoe, a hollow cone supported in said tube between the rollers and adapted to be shifted longitudinally thereof to move said rollers and the shoes cooperating therewith outwardly, means for yieldably holding said cone in position between said rollers, and a pressure ring located within said hollow cone and adapted to exert an endwise pressure in a direction that will move said cone to operative position, said pressure ring being provided with diametrically opposed portions adapted to bear against said cone and having a swivel connection with said stationary brake disk on a line substantially midway of said diametrically opposed cone engaging portions, and means carried by the brake disk and cooperating with said pressure ring at a point diametrically opposite its swivel connection for moving said ring into engagement with said cone.

Signed at Detroit, Michigan, this 24 day of Nov., 1928.

MATHEW B. MORGAN.